United States Patent [19]

Hasegawa et al.

[11] Patent Number: 5,209,546

[45] Date of Patent: May 11, 1993

[54] STRUCTURE FOR DRAINING LIQUID FOR A VEHICLE AND METHOD FOR FORMING THE STRUCTURE

[75] Inventors: Minekazu Hasegawa; Keiichi Ikeda; Junichi Fujihira, all of Chiba, Japan

[73] Assignee: Kinugawa Rubber Industrial Co., Ltd., Chiba, Japan

[21] Appl. No.: 597,401

[22] Filed: Oct. 15, 1990

Related U.S. Application Data

[60] Division of Ser. No. 463,887, Jan. 11, 1990, Pat. No. 5,009,464, which is a continuation of Ser. No. 77,370, Jul. 24, 1987, abandoned.

[30] Foreign Application Priority Data

| Jul. 25, 1986 | [JP] | Japan | 61-175092 |
| Aug. 11, 1986 | [JP] | Japan | 61-188171 |
| Aug. 12, 1986 | [JP] | Japan | 61-189180 |
| Jan. 14, 1987 | [JP] | Japan | 62-7149 |

[51] Int. Cl.⁵ .............................................. B60J 10/12
[52] U.S. Cl. .................................... 296/213; 296/154; 296/208; 296/218; 49/476.1; 49/479.1
[58] Field of Search ............... 296/154, 208, 213, 218; 49/476, 479

[56] References Cited

U.S. PATENT DOCUMENTS

| 2,556,062 | 6/1951 | Buehrig | 296/218 |
| 4,475,766 | 10/1984 | McKee | 296/218 Y |
| 5,009,464 | 4/1991 | Hasegawa et al. | 296/213 |

*Primary Examiner*—Dennis H. Pedder
*Attorney, Agent, or Firm*—Foley & Lardner

[57] ABSTRACT

A water-tight structure for draining liquid and method for forming the structure applicable to a hatch-roof (T-bar roof) type vehicle are disclosed in which a V-shaped groove of a first weatherstrip disposed aside a center pillar of a vehicle body, opening of a roof onto which a detachable hatch roof is attached, and a front pillar receives a wedge-shaped end of a second weatherstrip disposed along a side edge of the hatch roof in a tongue and groove joint form at a position of the center pillar bridged to the roof, a draining passage in a closed cross section is formed between a vehicle body panel and finisher both constituting the center pillar, a flange portion is integrally extended from that part of the first weatherstrip in the rearward direction, the flange portion being elastically contacted with the hatch roof and finisher and introducing water such as rain drops from the rain water passage into another drain water passage, and a terminal portion of the first weatherstrip is formed by means of a mold together with a cut out portion of a seal lip disposed along an elongated direction of the first weatherstrip. The terminal portion may be provided with a plurality of ribs.

10 Claims, 14 Drawing Sheets

STRUCTURE FOR DRAINING LIQUID FOR A VEHICLE AND METHOD FOR FORMING THE STRUCTURE

This application is a division of application Ser. No. 07/463,887, filed Jan. 11, 1990, now U.S. Pat. No. 5,009,464, which is a continuation of application Ser. No. 07/077,370, filed on Jul. 24, 1987, now abandoned.

BACKGROUND OF THE INVENTION

The present invention relates to a structure for draining liquid for a vehicle such as a hatch-roof (T-bar roof) type vehicle and method for forming the structure therefor. A pair of hatch roofs are specifically detachable from respective openings of a roof of a vehicle body.

A Japanese Patent Application first Publication (Tokkai) sho 61-1535 published on Jan. 7, 1986 exemplifies such a type of structure for draining liquid for the hatch-roof type vehicle. In the above-identified Japanese Patent Application first Publication, the pair of the hatch roofs are detachably mounted on the roof. A first weatherstrip disposed along a side edge of each hatch roof serves to seal an opposing upper edge of a door glass when the corresponding hatch roof is attached to the roof of the vehicle body. In addition, a second weatherstrip is disposed along a center pillar, a peripheral edge of the corresponding opening for receiving the hatch roof, and a front pillar. When the hatch roof is attached to the opening end of the roof, an elongated end surface of the first weatherstrip is brought in contact with a corresponding end surface of the second weatherstrip disposed along the center pillar and an upper end of the front pillar, forming butt joints, so that a continuous contour on each side of the vehicle body in a vehicle width direction is formed.

The first weatherstrip, furthermore, has a hollow in it along its elongated direction and the second weatherstrip has substantially the same cross section as the first weatherstrip. However, the end surfaces of both first and second weatherstrips which are butted on each other have wall structures to enclose such inner hollow portions. Since each of the hatch roofs is attached onto the roof in a manner of carrying it on the roof from above the roof so as to engage the roof and pressing it downward so as to attach completely to the roof, each end surface of both first and second weatherstrips is inclined relatively with respect to a vertical direction of the vehicle body so that one end surface of the first weatherstrip is butted on the inclined corresponding end surface of each second weatherstrip when the hatch roof is pressed downward on the roof as described above. Consequently, both first and second weatherstrips can provide a favorable sealing structure to avoid invasion of liquid such as rain water into a passenger compartment.

However, a part of one of the second weatherstrips which is disposed on an upper end of the center pillar and is slightly projected in the forward direction of the vehicle body and accordingly an opposing part of the first weatherstrip is slightly widthdrawn in the forward direction in order to bring the corresponding end surface of the first weatherstrip in close contact with the opposing end surface of the second weatherstrip. Therefore, when the first weatherstrip is pressed downward to attach the corresponding hatch roof to the roof, friction between abutment end surfaces is so large that the above-described part of the second weatherstrip is forcibly deviated downward to the door glass. Consequently, an alignment difference occurs between both first and second weatherstrips. Therefore, a sealing characteristic is deteriorated. Such an incomplete sealing is bad for the external appearance of the vehicle body. Especially, the alignment difference described above becomes large as a distance between the part of the first weatherstrip which faces against the corresponding end surface of the second weatherstrip and a parting surface of the hatch roof from the roof becomes large.

A Japanese Utility Model Application first Publication Sho 59-8820 published on Jan. 20, 1984 exemplifies the other structure for draining liquid for the vehicles. In the above-identified Japanese Utility Model Application Publication, a water passage in a channel shape of cross section is formed along the peripheral edge of the opening to trap liquid such as rain waterdrops. A dam portion is formed on a roof side portion of the second weatherstrip disposed along the roof bridged to the center pillar. The dam portion causes the water flow on the water passage to be interrupted and a draining pipe disposed upstream of the dam portion is used to drain water in the dam portion outside of the vehicle body via a hose.

In the above-described structure of the above-identified Japanese Utility Model Application Publication, the hose needs to be prepared and the draining pipe is extended toward the inside of the passenger compartment. Therefore, it is troublesome to apply the long hose to the pipe to drain the water in the dam portion. In addition, if overflow of water occurs in the dam portion, the water flows down over the dam portion along the second weatherstrip. If a mounting misalignment of the door glass with respect to the center pillar, the overflow water invades into the inside of the passenger compartment via a clearance between the door glass and side edge of the second weatherstrip.

Furthermore, if the hatch roof and a seal lip of the second weatherstrip are not sufficiently contacted with each other due to an assembly error in the vehicle body, a part of water overflowed through the dam portion may leak into the inside of the passenger compartment via a rearward surface of each hatch roof when rain falls and the hatch roof is attached to the opening end of the roof.

SUMMARY OF THE INVENTION

It is an object of the present invention to provide an improved water-tight structure for draining water for a vehicle and method for forming the structure therefor.

It is another object of the present invention to provide the water-tight structure for draining water for the vehicle and method for forming the structure therefor in which an elastic member disposed on each of detachable hatch roofs has a wedge-shaped end portion and another elastic member disposed on an opposing part of a vehicle body has a receiving portion for receiving the wedge-shaped end portion of the elastic member to form a tongue and groove joint between the elastic members.

It is further object of the present invention to provide the water-tight structure for draining liquid for the vehicle and method for forming the structure without a water dam portion and without invasion of liquid into an inside of a passenger compartment.

It is still another object of the present invention to provide the water-tight structure for the vehicle and method for forming the structure, in which a terminal portion of a weatherstrip disposed along a center pillar is easily and cost-effectively formed.

The above-described objects can be achieved by providing a structure for draining liquid for a vehicle, comprising: a) a plate like member attachable to an opening end cut out along a roof of a vehicle body; b) a first weatherstrip disposed along the opening end of the roof and a center pillar of the vehicle body, the first weatherstrip defining a first draining passage with a peripheral edge of the opening end; c) a finisher disposed along the center pillar, the finisher defining a second draining passage with a vehicle body panel constituting the center pillar; and d) a flange extended integrally from the first weatherstrip in a rearward direction of the vehicle body, the flange defining a third draining passage between the first and second draining passages.

The above-described objects can be achieved by providing a structure for draining liquid, comprising: a) a plate like member attachable to a predetermined opening end of a roof of an object; b) first means defining a first passage along a side edge of the opening end of the roof; c) second means defining a second passage at a part of the roof bridging the side edge of the opening end and upper end of a pillar supporting the roof; d) third means defining a third passage between the pillar and another elongated plate like member disposed along the pillar, the first, second, and third passages continued to form a drainage.

The above-described objects can be achieved by providing a method for forming a terminal portion of a weatherstrip member disposed along a center pillar of a vehicle body, the weatherstrip member having a hollow portion and a seal lip portion at an intermediate part of the weatherstrip and a drainage outlet opening communicated with the hollow portion and a lip extension continued with the seal lip portion at a terminal part of the weatherstrip, comprising the steps of: a) inserting an end of the intermediate portion of the weatherstrip member into a mold; b) cutting the seal lip portion along a predetermined length thereof at the end of the intermediate portion; and c) molding a cut out portion cut in the step (b) together with the terminal portion thereof.

DETAILED DESCRIPTION OF THE PREFERRED EMBODIMENTS

Reference will hereinafter be made to the drawings in order to facilitate understanding of the present invention.

FIRST PREFERRED EMBODIMENT

Figure 1:
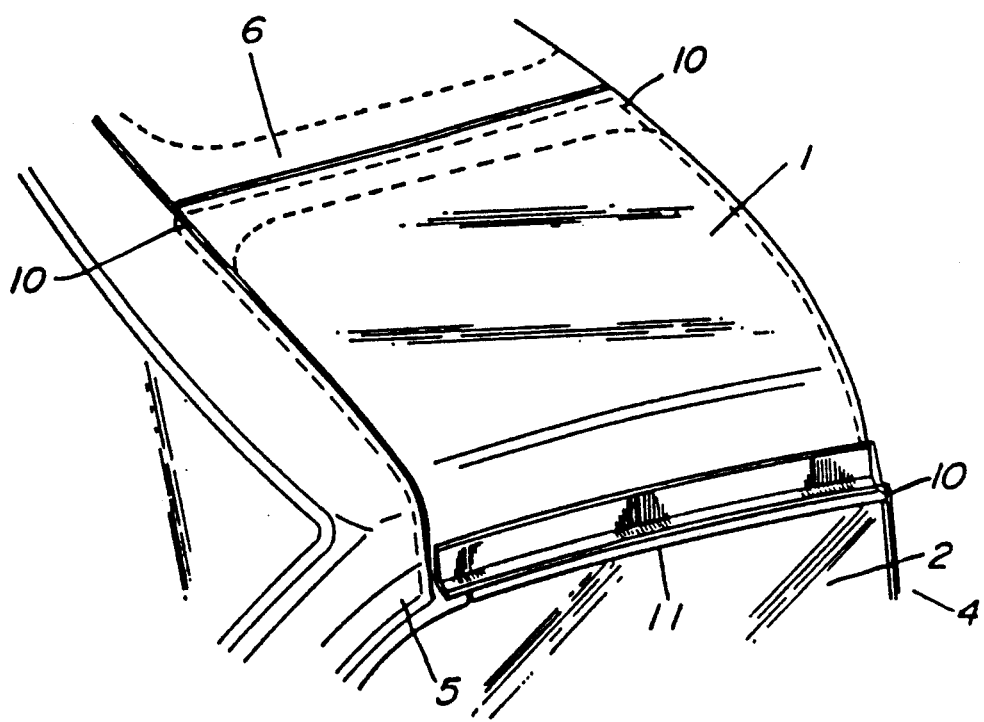
FIG. 1 is a perspective view of a part of a vehicle body on which a detachable hatch roof is mounted and to which the present invention is applicable.
Figure 2:
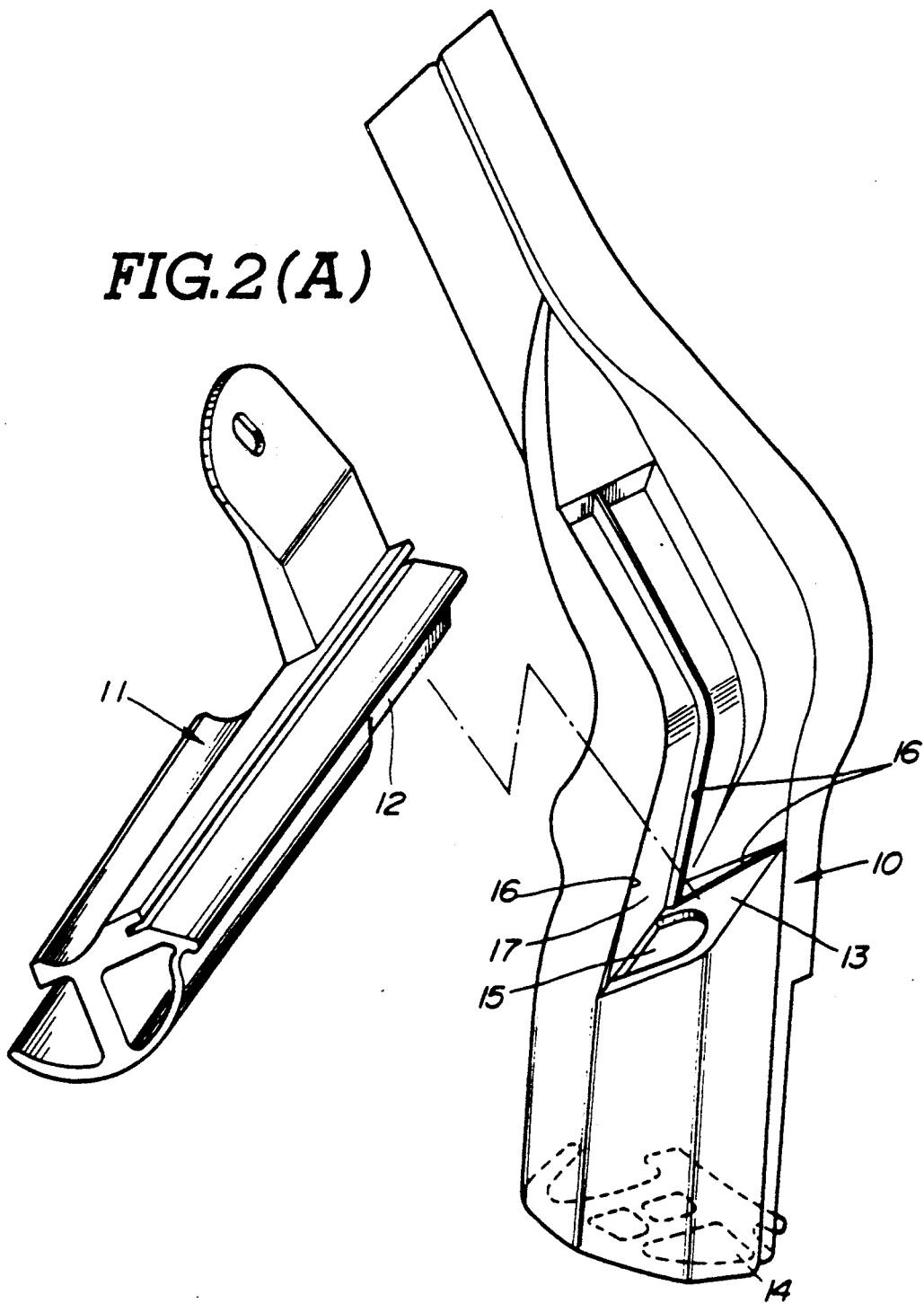
FIGS. 2(A) and 2(B) are integrally perspective views of structures of first and second weatherstrips in a first preferred embodiment according to the present invention.

FIG. 1 shows an essential part of a vehicle body of a hatch-roof (T-bar roof) type vehicle to which the present invention is applicable.

FIGS. 2(A) to 4 show a structure for draining liquid in a first preferred embodiment according to the present invention.

As shown in FIG. 1, a pair of detachable hatch roofs 1 are attached to respective openings formed on a roof portion 6 of a vehicle body. A first weatherstrip 10 is disposed along a center pillar 4, a peripheral edge of the opening end of the roof 6, and a front pillar 5. The other first weatherstrip 10 is disposed in the same portions as described above on the opposing surface of the vehicle body (not shown). On the other hand, a second weatherstrip 11 is disposed along a side edge of the hatch roof 1 which opposes a door glass 2. The same second weatherstrip 11 is disposed along the side edge of the hatch roof 1 opposing the door glass 2 at an opposite surface of the vehicle body (not shown).

Figure 4:
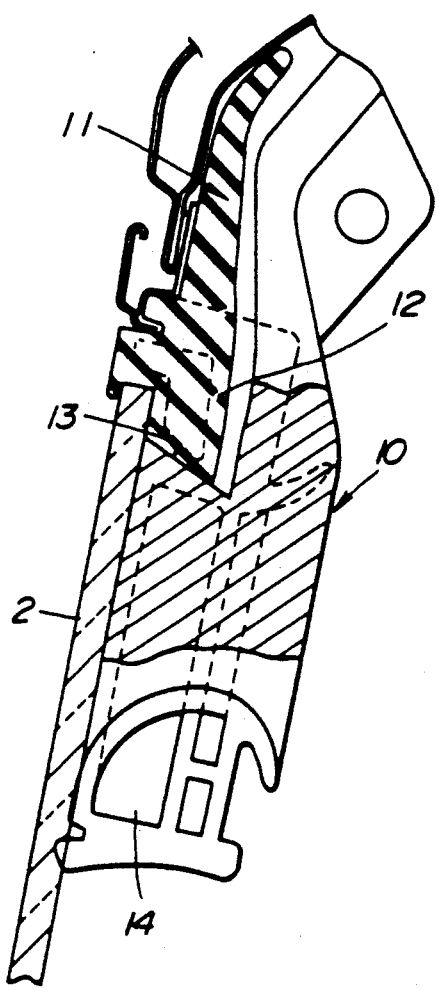
FIG. 4 is a cross sectional view of both first and second weatherstrips cut away along a line IV—IV of FIG. 3.
Figure 5:
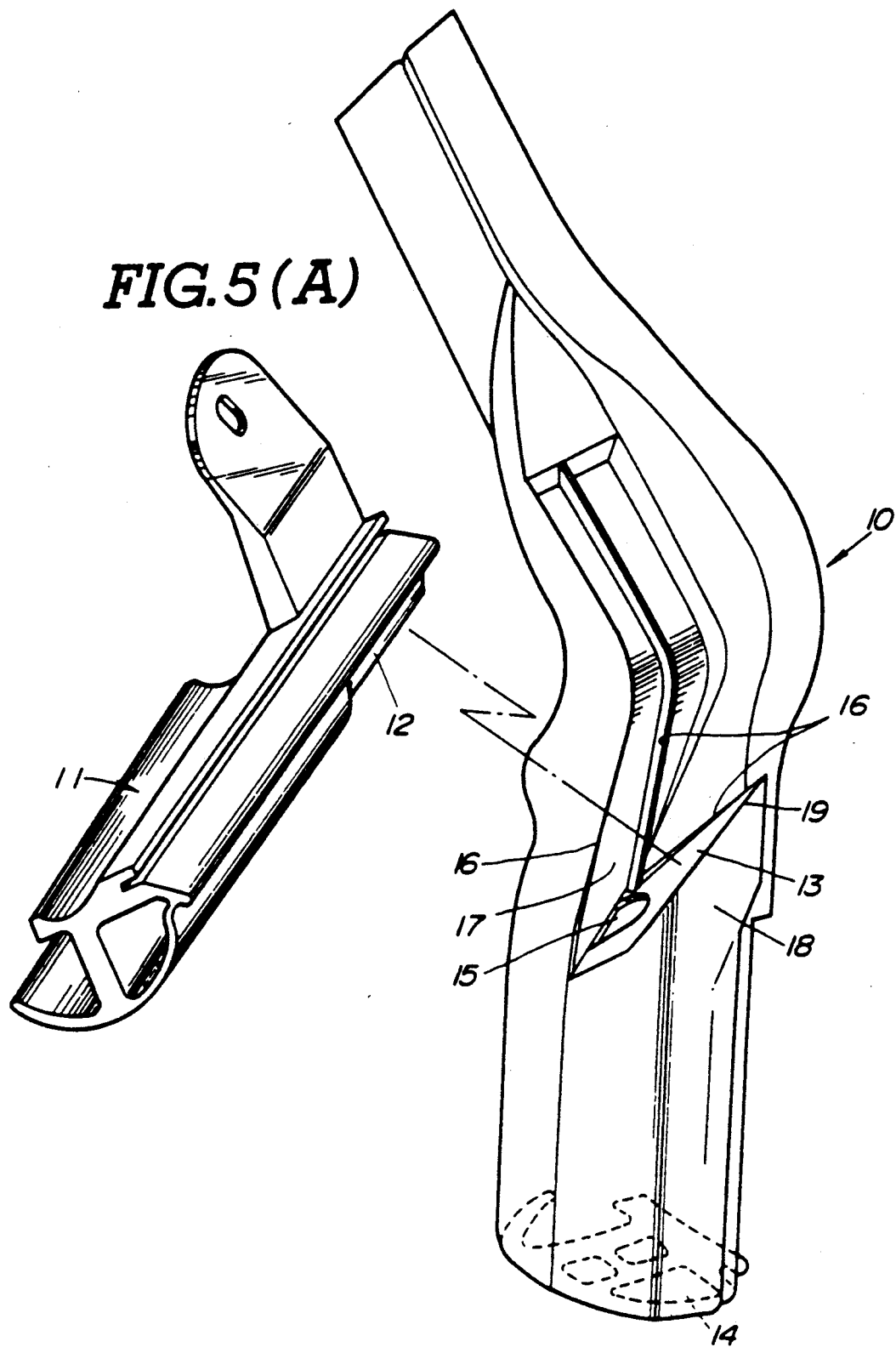
FIGS. 5(A) and 5(B) are integrally perspective views of the structure of both first and second weatherstrips used in a second preferred embodiment according to the present invention.
Figure 6:
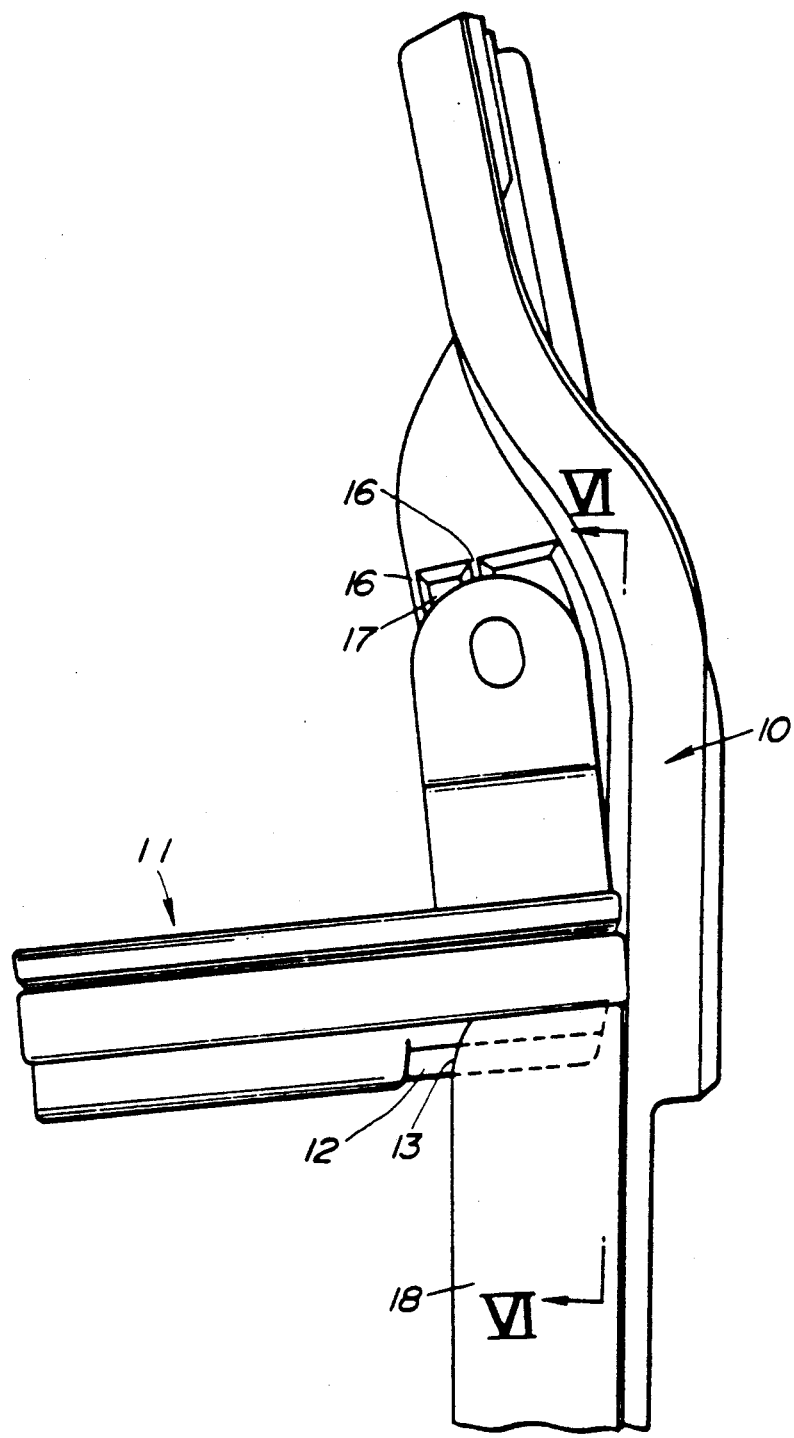
FIG. 6 is an explanatory front view for explaining the draining structure of both first and second weatherstrips in the second preferred embodiment shown in FIGS. 5(A) and 5(B).

As shown in FIGS. 2(A) and 4, the second weatherstrip 11 has a wedge-shaped cross section at its rear end portion 12, its position corresponding to a portion of the vehicle body bridging the roof 6 and center pillar 4 in FIG. 1. On the other hand, an intermediate side end of the first weatherstrip 10 which faces the rear end portion 12 of the second weatherstrip 11 has a space defining a substantially letter V-shaped groove 13. An opening 15 serving as a water passage inlet is communicated with a hollow portion 14 provided along an elongated direction of the first weatherstrip 10. The opening 15 is formed at a bottom part of the V-shaped groove 13. Bead portions 16 extend upward from the bottom part thereof.

Figure 3:
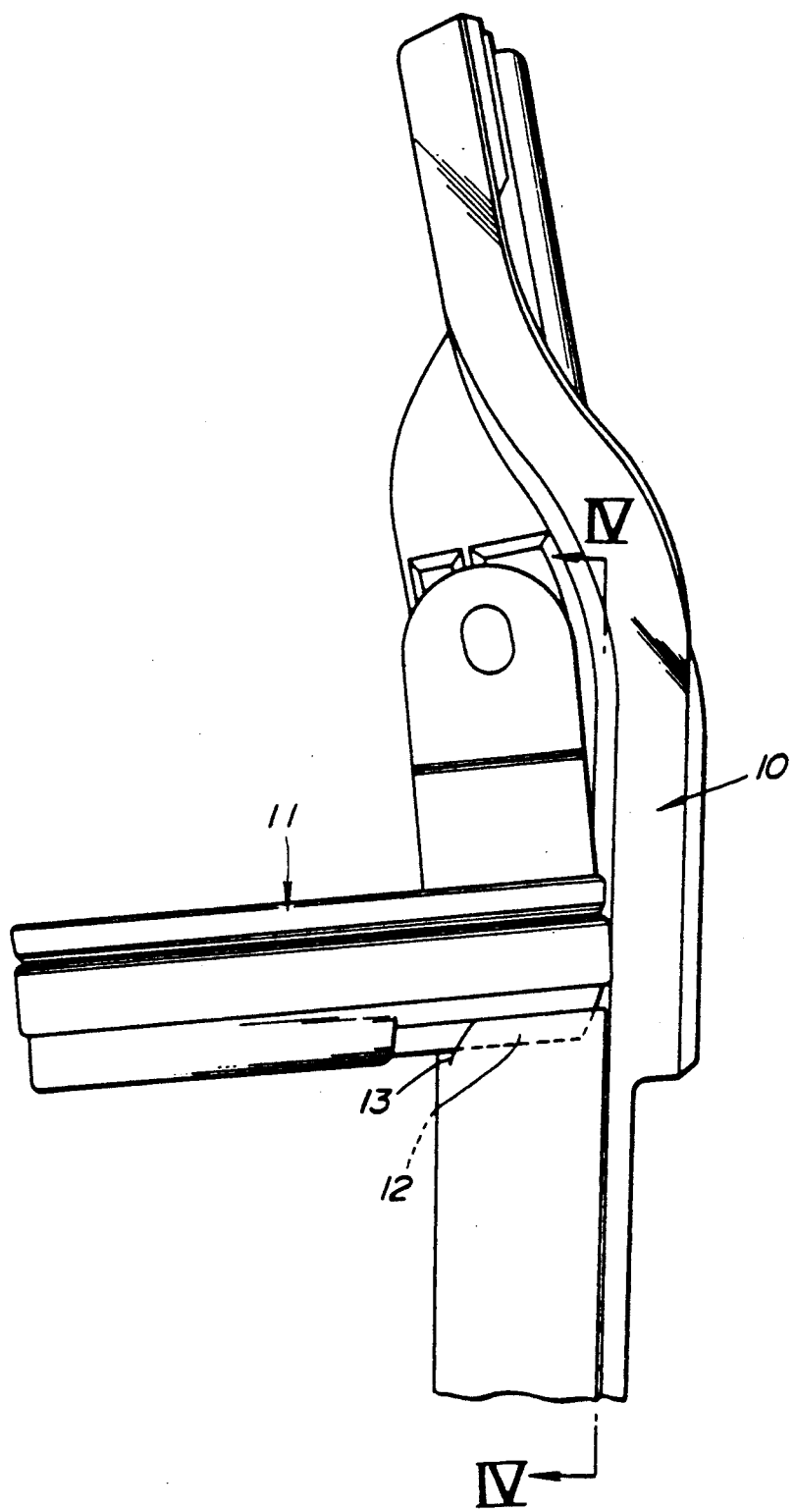
FIG. 3 is an explanatory front view for explaining the structure for draining liquid for a vehicle in the first preferred embodiment shown in FIGS. 2(A) and 2(B).

Hence, when the hatch roof 1 is attached into the opening of the roof 6 to close the passenger compartment, the wedge-shaped rear end portion 12 of the second weatherstrip 11 is received by the space defining the V-shaped groove 13 of the first weatherstrip 10 to form a tongue and groove joint as shown in FIGS. 3 and 4. Consequently, a favorable water-tight structure can be achieved and no alignment difference between both weatherstrips can occur.

Water such as rain drops flowing on the roof 6 and hatch roof 1 passes through a water passage 17 defined by the bead portions 16, the opening 15, and hollow portion 14 of the first weatherstrip 10 is drained outside of the vehicle body at a lower terminal part of the first weatherstrip 10.

SECOND PREFERRED EMBODIMENT

FIGS. 5(A) to 7 show a second preferred embodiment. The like reference numerals shown in FIGS. 5(A) to 7 designate corresponding elements described in the first preferred embodiment.

In the second preferred embodiment, a seal lip 19 is projected from the bottom part of the V-shaped groove portion 13 of the first weatherstrip 10.

Figure 7:
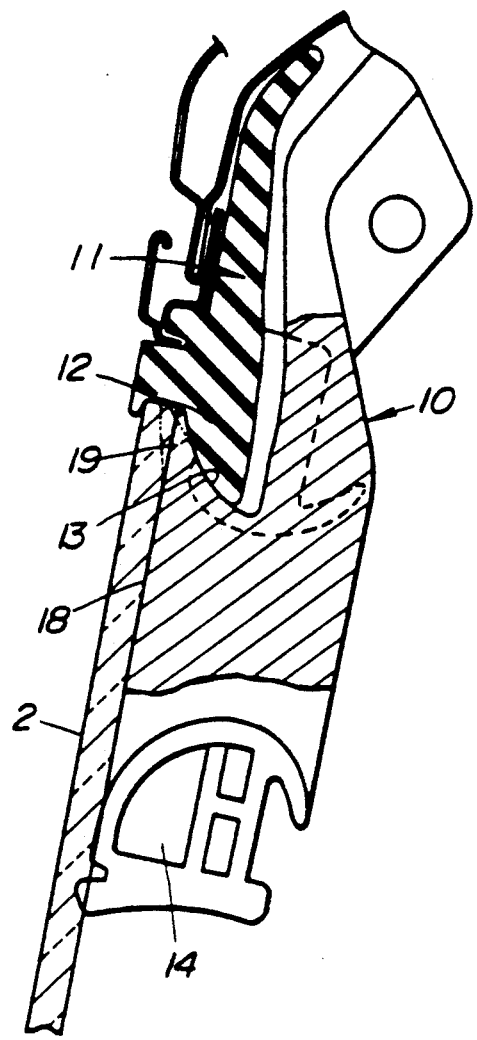
FIG. 7 is a cross sectional view of both first and second weatherstrips cut away along a line VII—VII of FIG. 6.

The seal lip 19 is flexible and elastically abuts on the wedge-shaped rear end portion 12 of the second weatherstrip 11 and flexed to the door glass 2, as shown in FIG. 7, when the door glass 2 is completely moved upward to close the passenger compartment. A better water tight structure can be achieved. In addition, external appearance of the whole vehicle body is improved.

THIRD PREFERRED EMBODIMENT

Figure 8:
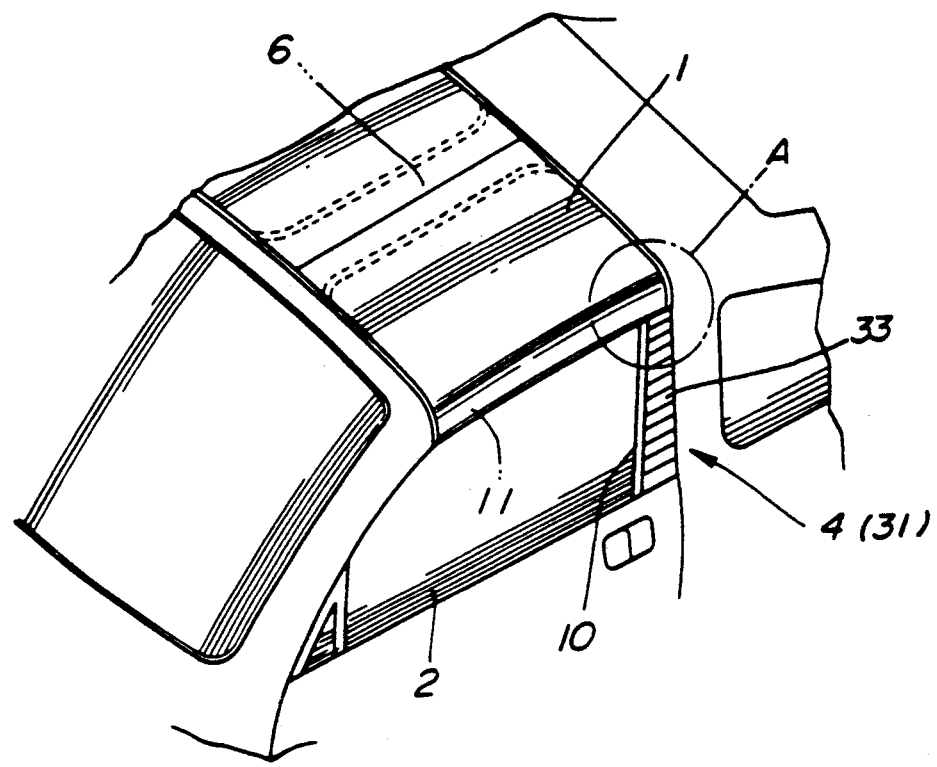
FIG. 8 is a perspective view of an essential part of a vehicle body to which a third preferred embodiment according to the present invention is applicable.
Figure 10:
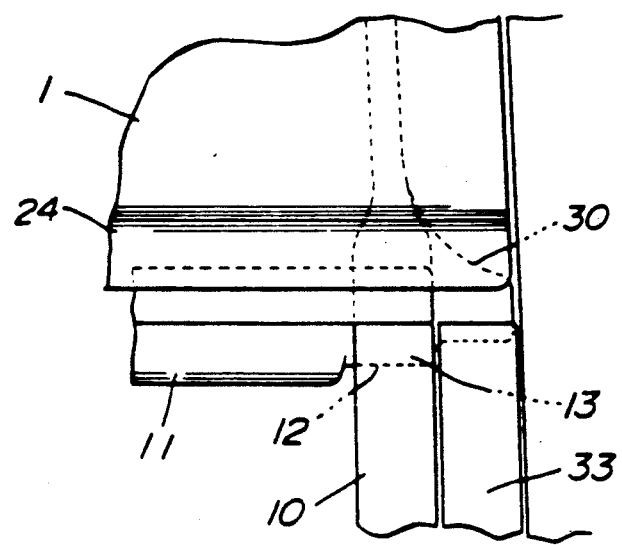
FIG. 10 is a front view of the part A shown in FIG. 8 to which the third preferred embodiment is applicable.
Figure 9A:
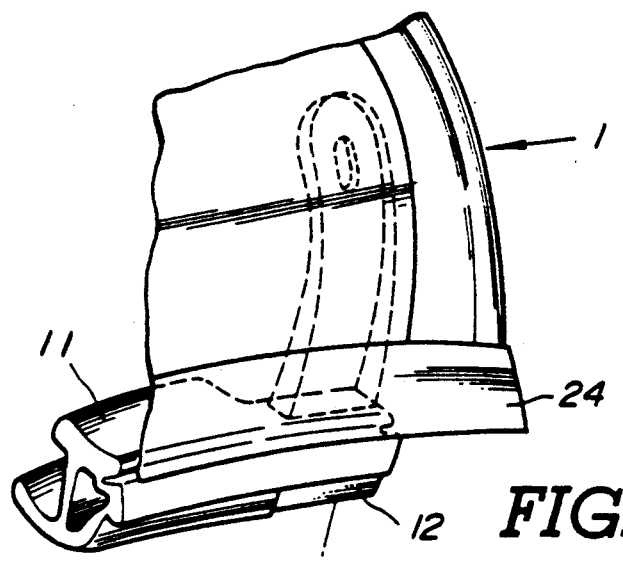
FIGS. 9(A) and 9(B) are integrally exploded perspective views of the structure of the first and second weatherstrips in the third preferred embodiment applicable to a part of the vehicle body denoted by A in FIG. 8.
Figure 9B:
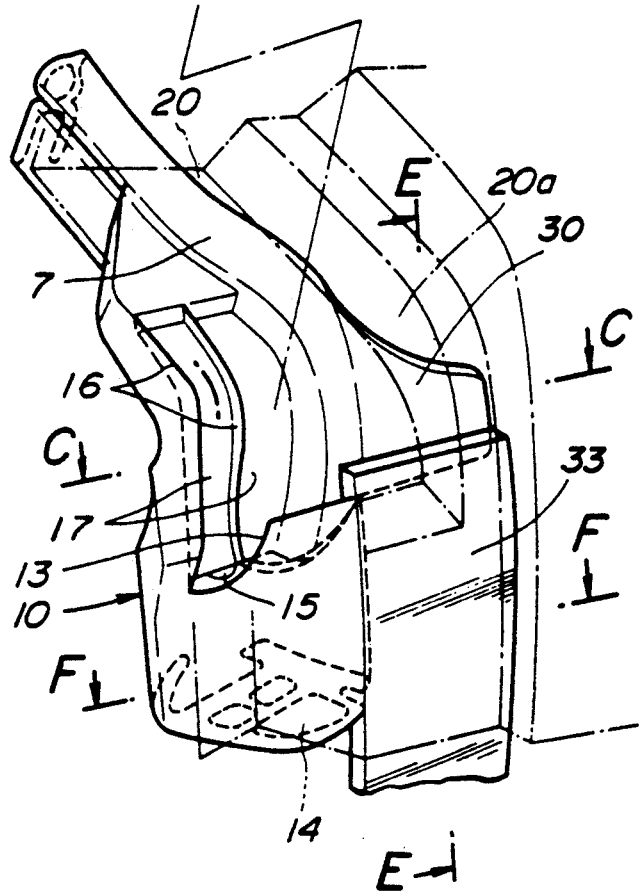

FIG. 8 shows a portion of the vehicle body to which the structure for draining liquid in a third preferred embodiment according to the present invention is applicable.

The portion denoted by A in FIG. 8 is the same portion to which the first and second preferred embodiments are applicable. It is noted that a finisher 33 is overlapped on the center pillar 4.

FIGS. 9(A) to 14 show a third preferred embodiment according to the present invention.

A molding 24 is disposed on the second weatherstrip 11. The rear end portion 12 of the second weatherstrip 11 is formed in the wedge-shaped cross section as described in the first and second preferred embodiments. The immediate side end of the first weatherstrip 10 is formed with the space defining the V-shaped groove 13 to receive the wedge-shaped cross section rear end portion 12 of the second weatherstrip 11 as described in the first and second preferred embodiments. The other structures are substantially the same as those in the first and second preferred embodiments.

Figure 11:
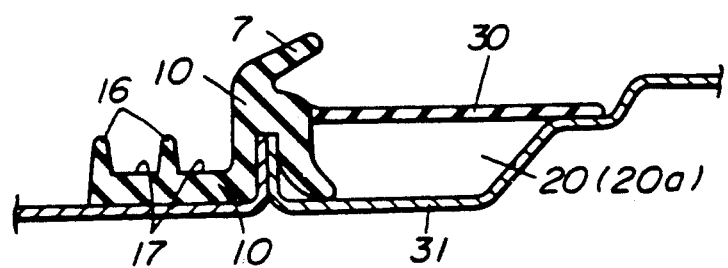
FIG. 11 is a cross sectional view of the first weatherstrip and related center pillar cut away along a line C—C of FIG. 9(B).
Figure 12:
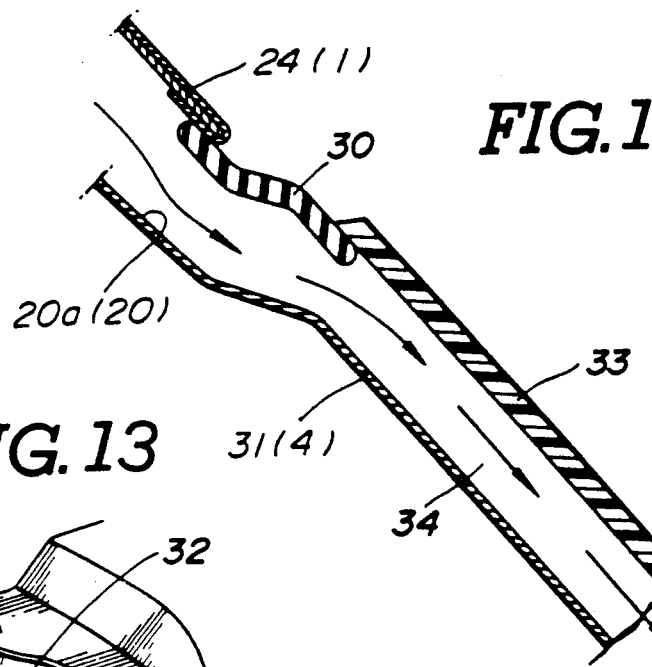
FIG. 12 is a cross sectional view of the first weatherstrip and the related center pillar cut away along a line E—E of FIG. 9(B).
Figure 13:
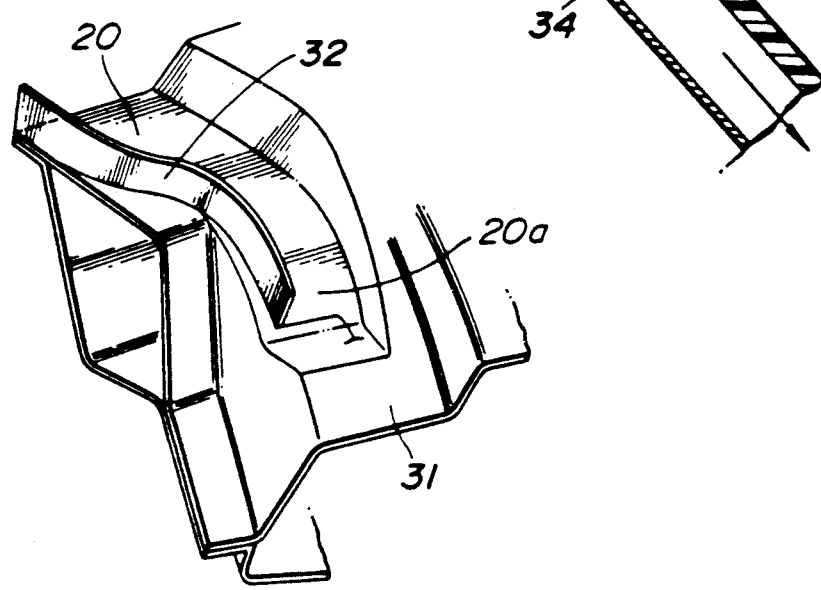
FIG. 13 is a perspective view of a water passage provided at the part A in FIG. 8 and aside the first weatherstrip shown in FIG. 9(B).

In the third preferred embodiment, however, a flange portion 30 in a substantially tongue shape is integrally formed on the first weatherstrip 10 in a rearward direction of the vehicle body, as shown in FIGS. 8(B), 11, and 12. The flange portion 30 is elastically contacted with the center pillar 4 of a vehicle body panel 31 to cover an opening end 20a of a water passage 20. When the hatch roof 1 is attached into the opening end of the roof 6, an end of the molding 24 is elastically contacted with the flange portion 30. A width of the opening end 20a of the water passage 20 is aligned with the finisher 33 by bending a part of flange portion 32 of the vehicle body panel 31 defining the water passage in the rearward direction.

Figure 14:
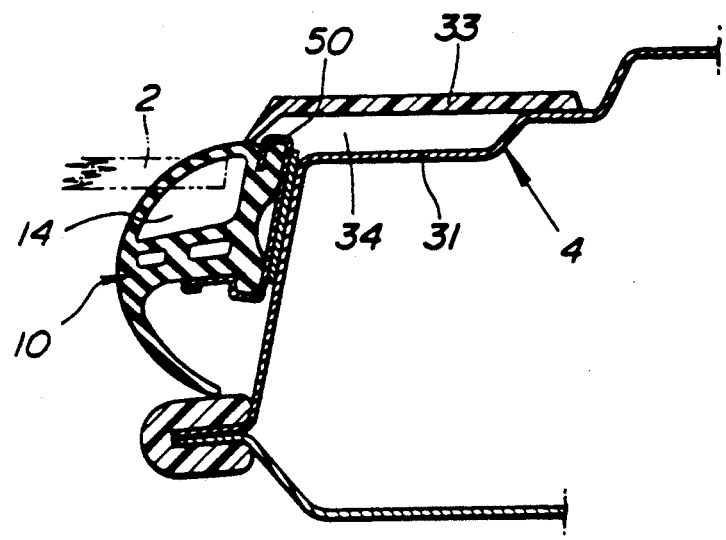
FIG. 14 is a cross sectional view of the first weatherstrip and a vehicle body panel cut away along a line F—F of FIG. 9(B).

In the other hand, a finisher 33 is disposed so as to enclose the first weatherstrip 10 along the center pillar 4. It is noted that a draining passage 34 in a closed cross section is defined by the vehicle body panel 31 and finisher 33 as shown in FIGS. 12 and 14.

An upper end of the finisher 33 is elastically contacted with the flange portion 30, the opening end 20a of the water passage 20 being substantially linked with the draining passage 34.

Hence, in this embodiment water trapped on the water passage 20 is drained outside of the vehicle body from the opening end 20a through the draining passage 34.

If there is an amount of water exceeding the seal lip 7 due to dispersions in closely contacting state of the hatch roof 1 with the opening, such a water flows through water passages 17 defined by the bead portions 16, opening 15, and hollow portion 14. Thus, the water is drained outside of the vehicle body.

In addition, since the molding 24 disposed on the hatch roof 1 and upper end of the finisher 33 are elastically contacted with the flange portion 30, a colored portion of the vehicle body is not exposed through a clearance between the molding 24 and finisher 30 and no water directly flows from the clearance.

In this way, in the third preferred embodiment, no preparation of a hose to drain water is required, water flow is not interrupted, and no leak of water into the inside of the vehicle body occurs.

FOURTH PREFERRED EMBODIMENT

FIGS. 15 to 19 show a fourth preferred embodiment according to the present invention.

It is noted that a lower terminal part of the first weatherstrip 10 is approximately placed on a lower end of the center pillar 4.

Figure 15:
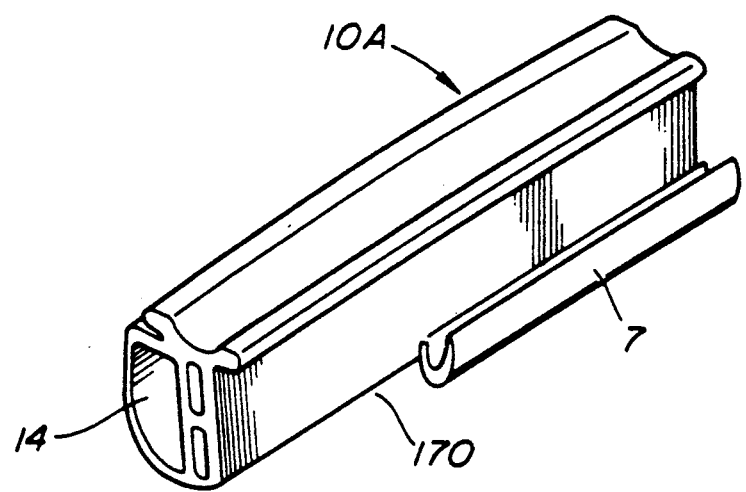
FIG. 15 is a perspective view of an intermediate part of the first weatherstrip used in a fourth preferred embodiment.

FIG. 15 shows an intermediate part 10A of the first weatherstrip 10, its position corresponding to an intermediate part of the center pillar 4.

As shown in FIG. 15, for an end of the intermediate part 10A of the first weatherstrip 10 formed by extrusion, a part of a seal lip 7 of the intermediate part 10A of the first weatherstrip 10 is previously cut out (numeral 170 denotes the cut out portion).

Figure 18:
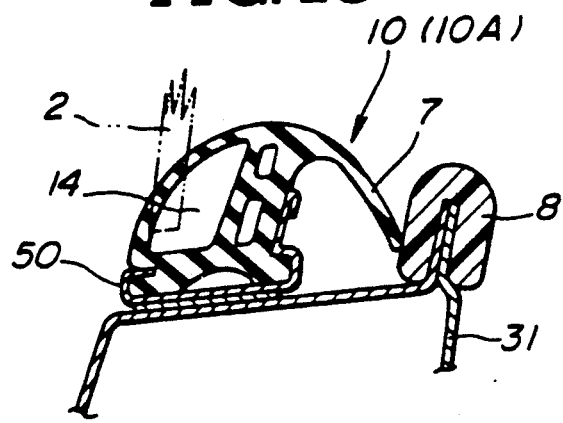
FIG. 18 is a cross sectional view of the first weatherstrip and related vehicle body panel cut away along a line G—G of FIG. 16.
Figure 19:
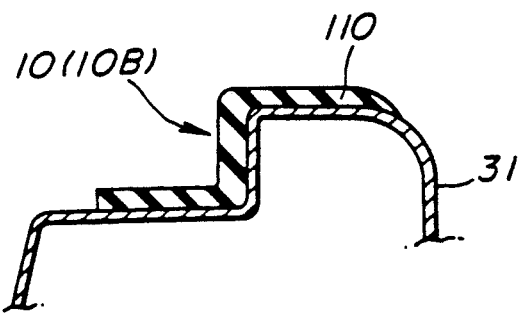
FIG. 19 is a cross sectional view of the first weatherstrip and related vehicle body panel cut away along a line H—H of FIG. 16.

It is noted that the lip 7 is to be elastically contacted with a welt 8 fixed to the body panel 31 as shown in FIG. 18.

Figure 16:
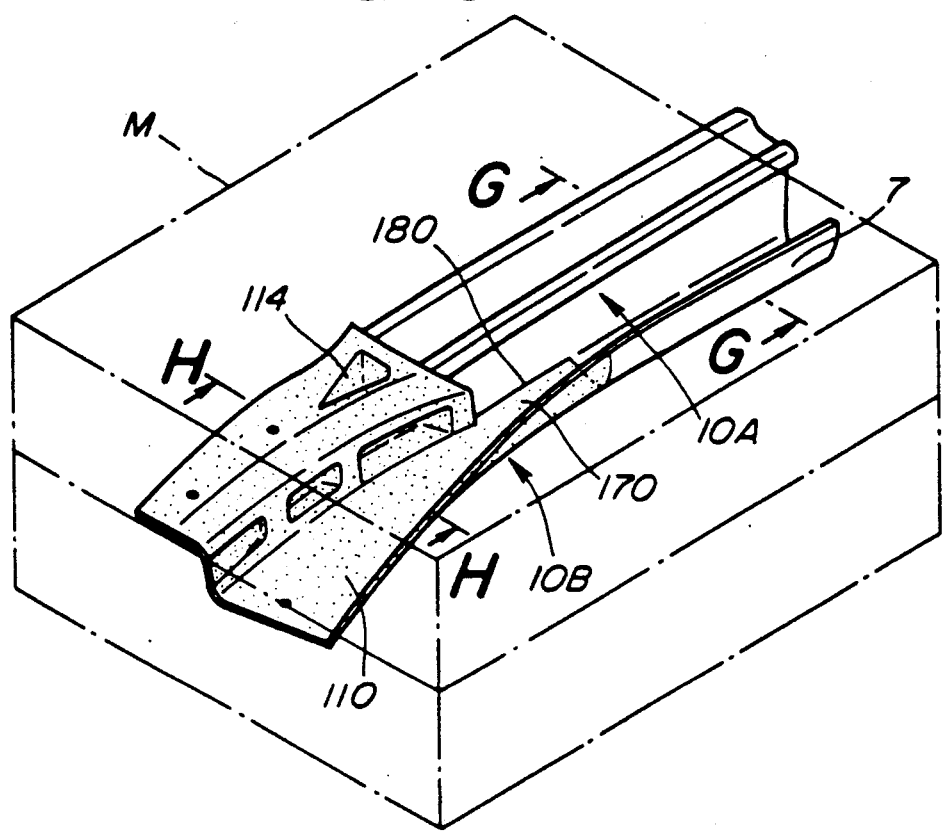
FIG. 16 is a perspective view of intermediate and lower terminal parts of the first weatherstrip formed in the fourth preferred embodiment.

The end of the intermediate part 10A is then inserted into a mold denoted by M in FIG. 16 with a part from a lower tip of the first weatherstrip 10 to the cut out portion 170 being subjected to mold. It is noted that when the end part of the intermediate portion 10A is inserted into the mold M, a core is previously inserted into the hollow portion 14.

Figure 17:
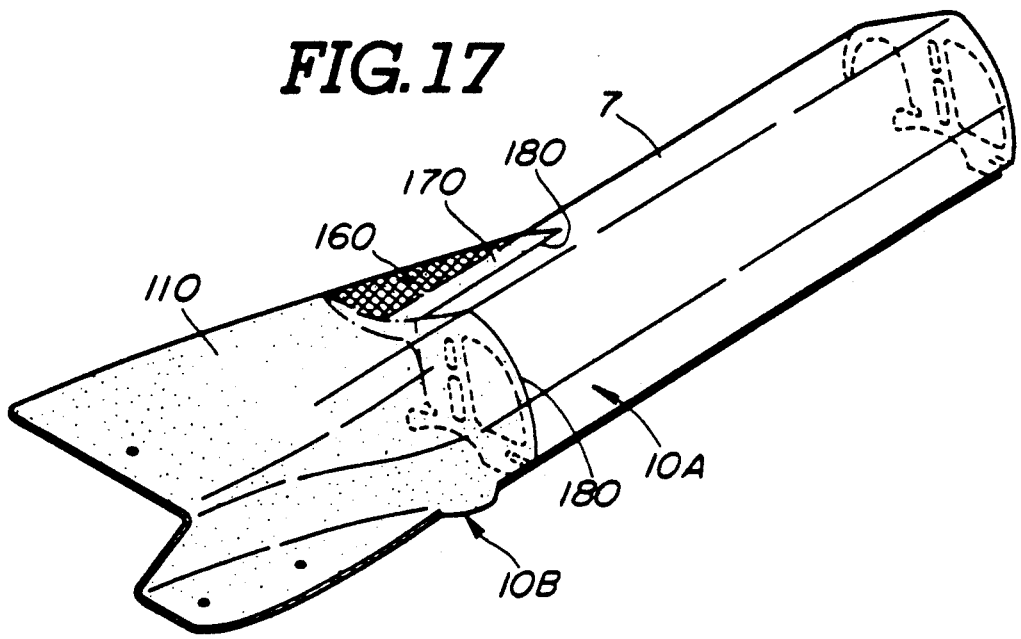
FIG. 17 is an inverted view of the first weatherstrip shown in FIG. 16.

Thereafter, when a predetermined raw rubber (in liquid phase) is injected into the mold M, a wide lower terminal portion 10B having a drain water outlet 114 and a lip extension 110 is joined together and formed integrally to the end part of the intermediate part 10A via a joint portion 180. At the same time, as shown in FIGS. 16 and 17, the cut out portion 170 and corner portion 180 shown in FIGS. 16 and 17 are molded so that the seal lip 7 and lip extension 110 are smoothly continued via the cut out portion 170 and corner portion 180. In this way, a wide range of parts including the cut out portion 170 and corner portion 180 is molded together with the lower end portion 10B of the first weatherstrip 10. Therefore, no such defects as incomplete flow of the raw rubber material occur. In addition, the core used in the fourth preferred embodiment has a short length and can smoothly be extracted from the drain water outlet 114.

As described in the fourth preferred embodiment, the mold is used for molding only the lower terminal part 10B and a part of the seal lip 7. Therefore, the range to be molded with the mold M becomes smaller. In addition, the drain water passage 114 formed in the terminal part 10B of the first weatherstrip 10 can be utilized as a hole for drawing out the core. Therefore, no additional cost required to provide an additional hole to draw out the core is eliminated. Furthermore, since the flow of raw rubber material during the molding of the cut out portion of the seal lip becomes smooth, no molding defects occur due to lack in the rubber material.

FIFTH PREFERRED EMBODIMENT

Figure 20:
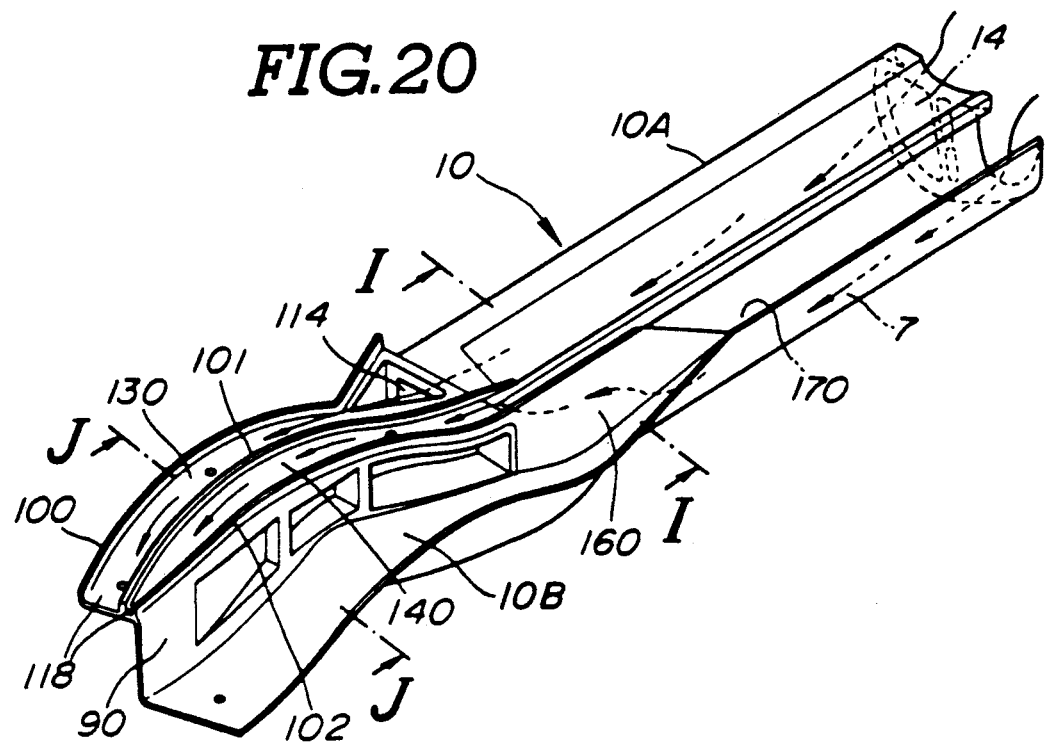
FIG. 20 is a perspective view of the lower terminal part of the first weatherstrip used in a fifth preferred embodiment according to the present invention.
Figure 21:
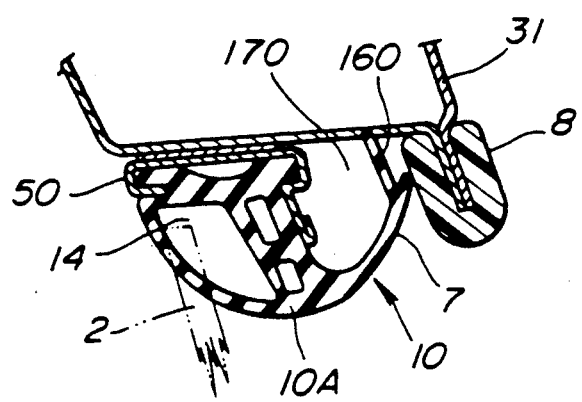
FIG. 21 is a cross sectional view of the first weatherstrip used in the fifth preferred embodiment cut away along a line I—I of FIG. 20.
Figure 22:
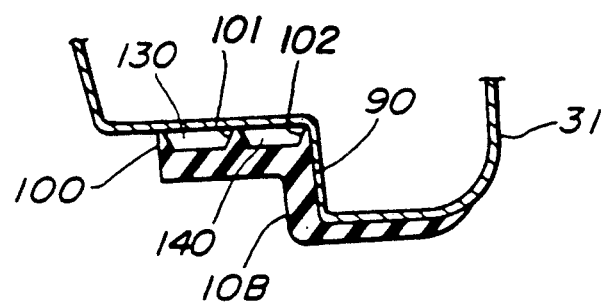
FIG. 22 is another cross sectional view of the first weatherstrip used in the fifth preferred embodiment cut away along a line J—J of FIG. 20.

FIGS. 20 to 22 show a fifth preferred embodiment according to the present invention.

In this embodiment, the first weatherstrip 10 is fixed to the vehicle body panel 31 via a retainer 50 in the same way as the fourth preferred embodiment shown in FIG. 16.

The intermediate part 10A of the first weatherstrip 10 has the same structure as described in he fourth preferred embodiment.

In the lower terminal part 10B of the first weatherstrip 10, three ribs 100, 101, and 102 are projected from a junction surface 90 contacted with the vehicle body panel 31. As shown in FIG. 22, main water passages 130, 140 are formed in closed cross section shapes with the ribs 100, 101, 102 and vehicle body panel 31. The drain water outlet 114 is opened upstream of one of the main water passages 130. The water trapped at the intermediate end of the first weatherstrip 10 which joins the second weatherstrip 11 flows through the drain water outlet 114 onto the main water passage 130. One of the ribs 102 formed on the junction surface 90 is extended toward the intermediate portion of the second weatherstrip 11 so that a water-proof wall 160 is formed which links the rib 102 with the lip 7. As shown in FIGS. 20 and 21, an auxiliary water passage 170 in a closed cross section is formed with the lip 7, water-proof wall 160, and vehicle body panel 31.

If, in the fifth preferred embodiment, there is a leaking water which invades from a clearance between the first weatherstrip 10 and retainer 50 or between the retainer 50 and vehicle body panel 31 up to a vicinity of the lip 7 located approximately toward the inside of the passenger compartment, such a water will not fall in the inside of the passenger compartment due to a block defined by the water-proof wall 160.

In other words, such a water as rain drops to be invaded into the inside of the passenger compartment flows from the auxiliary water passage 170 defined by the water-proof wall 160 to the main water passage 140 and is drained outside of the vehicle body through opening end portions 118 together with water flowing out of the drain water outlet 114.

Since, in the fifth preferred embodiment, the auxiliary water passage partially defined by the water-proof wall is formed in addition to the main water passages in order to drain such a water as rain drops invaded into the inside of the passenger compartment through the auxiliary and main water passages, rain drops will not fall into the inside of the passenger compartment. Therefore, a sealing characteristic is increased.

As described hereinabove, the structure for draining liquid for the vehicle and method for forming the structure according to the present invention can effectively drain water such as rain drops on the roof and side part of the vehicle body without invasion and leak of water into the inside of the passenger compartment. The sealing characteristic can remarkably improved. In addition, the structure can cost-effectively be formed.

It will clearly be understood by those skilled in the art that the foregoing description is made in terms of the preferred embodiments and various changes and modifications may be made without departing from the scope of the present invention which is to be defined by the appended claims.

What is claimed is:

1. A structure for draining liquid from a vehicle, comprising:
   a) a plate like member attachable to a peripheral opening edge of a vehicle roof, said peripheral opening edge defining an opening in said roof;
   b) a first weatherstrip disposed along said peripheral opening edge of said vehicle roof and disposed along a center pillar of said vehicle, said first weatherstrip defining a first draining passage with said peripheral opening edge;
   c) a finisher disposed along said center pillar, said finisher defining a second draining passage with said center pillar;
   d) a flange integral with said first weatherstrip and extending in a rearward direction of said vehicle, said flange defining a third draining passage between said first draining passage and said second drawing passage, a width dimension of said first draining passage being aligned with a width dimension of said second draining passage at the position of said third draining passage; and
   e) a second weatherstrip disposed along a side edge of said plate like member opposite a glass window in a door of said vehicle,
   said second weatherstrip having one end joining an intermediate portion of said first weatherstrip in the bridge area where said center pillar is connected to said vehicle roof when said plate like member is attached to said peripheral opening edge, said one end of said second weatherstrip having a V-shaped cross section and said intermediate portion of said first weatherstrip having a groove for receiving said V-shaped cross section as a tongue to form a tongue and groove joint when said one end joins said intermediate portion;

said first weatherstrip including at least two bead portions longitudinally extending along said first weatherstrip from said groove toward said opening, said first weatherstrip further including a hollow portion longitudinally extending from said groove in a direction toward a lower end of said center pillar, said bead portions and said hollow portion defining a fourth draining passage.

2. The structure according to claim 1, wherein:

said first weatherstrip includes an intermediate portion and a lower terminal portion continuing from said intermediate portion, said intermediate portion and said lower terminal portion disposed along said center pillar of said vehicle, said intermediate portion including a seal lip, and said lower terminal portion including an outlet opening communicating with said hollow portion and a lip extension continuing from said seal lip.

3. The structure according to claim 2, wherein:

said lower terminal portion comprises a plurality of ribs, a first adjoining pair of said ribs together with said center pillar forming a fifth draining passage communicating with said outlet opening, a second adjoining pair of said ribs together with said center pillar forming a sixth draining passage communicating with said seal lip.

4. The structure according to claim 3, wherein:

said lower terminal portion includes a waterproof wall extending between said seal lip and one of said ribs communicating with said sixth draining passage and said seal lip.

5. The structure according to claim 2, wherein:

a lower end of said intermediate portion is molded together with said lower terminal portion over a predetermined length in which said seal lip does not extend.

6. The structure for draining liquid from a vehicle, comprising:

a plate like member attachable to a peripheral opening edge of a vehicle roof, said peripheral opening edge defining an opening in said roof;

a first weatherstrip disposed along said peripheral opening edge of said vehicle roof and disposed along a center pillar of said vehicle, said first weatherstrip defining a first draining passage with said peripheral opening edge;

a flange integral with said first weatherstrip and extending in a rearward direction of said vehicle, said flange defining a second draining passage; and a second weatherstrip disposed along a side edge of said plate like member opposite a glass window in a door of said vehicle, said second weatherstrip having one end joining an intermediate portion of said first weatherstrip in the bridge area where said center pillar is connected to said vehicle roof when said plate like member is attached to said peripheral opening edge, said one edge of said second weatherstrip having a V-shaped cross section and said intermediate portion of said first weatherstrip having a groove for receiving said V-shaped cross section as a tongue to form a tongue and groove joint when said one end joins said intermediate portion;

said first weatherstrip including at least two bead portions longitudinally extending along said first weatherstrip from said groove toward said opening, said first weatherstrip further including a hollow portion longitudinally extending from said groove in a direction toward a lower end of said center pillar, said bead portions and said hollow portion defining a third draining passage.

7. The structure according to claim 6, wherein:

said first weatherstrip includes an intermediate portion and a lower terminal portion continuing from said intermediate portion, said intermediate portion and said lower terminal portion being disposed along said center pillar of said vehicle, said intermediate portion including a seal lip, and said lower terminal portion including an outlet opening communicating with said hollow portion and a lip extension continuing from said seal lip.

8. The structure according to claim 7, wherein:

said lower terminal portion comprises a plurality of ribs, a first adjoining pair of said ribs together with said center pillar forming a fourth draining passage communicating with said outlet opening, a second adjoining pair of said ribs together with said center pillar forming a fifth draining passage communicating with said seal lip.

9. The structure according to claim 8, wherein:

said lower terminal portion includes a waterproof wall extending between said seal lip and one of said ribs communicating with said fifth draining passage and said seal lip.

10. The structure according to claim 7, wherein:

a lower end of said intermediate portion is molded together with said lower terminal portion over a predetermined length in which said seal lip does not extend.

* * * * *